United States Patent
Beuschel

(10) Patent No.: US 12,517,228 B2
(45) Date of Patent: Jan. 6, 2026

(54) LIDAR MEASURING SYSTEM WITH TWO LIDAR MEASURING DEVICES

(71) Applicant: Microvision, Inc., Redmond, WA (US)

(72) Inventor: Ralf Beuschel, Friedrichshafen (DE)

(73) Assignee: Microvision, Inc., Redmond, WA (US)

( * ) Notice: Subject to any disclaimer, the term of this patent is extended or adjusted under 35 U.S.C. 154(b) by 1008 days.

(21) Appl. No.: 17/665,515

(22) Filed: Feb. 5, 2022

(65) Prior Publication Data

US 2022/0171030 A1  Jun. 2, 2022

Related U.S. Application Data

(63) Continuation of application No. PCT/EP2020/067233, filed on Jun. 19, 2020.

(30) Foreign Application Priority Data

Aug. 6, 2019 (DE) .................. 102019211739.2

(51) Int. Cl.
| | | |
|---|---|---|
| G01S 7/48 | (2006.01) | |
| G01S 7/481 | (2006.01) | |
| G01S 7/497 | (2006.01) | |
| G01S 17/894 | (2020.01) | |
| G01S 17/931 | (2020.01) | |

(52) U.S. Cl.
CPC .......... *G01S 7/4815* (2013.01); *G01S 7/4817* (2013.01); *G01S 7/4972* (2013.01); *G01S 17/894* (2020.01); *G01S 17/931* (2020.01)

(58) Field of Classification Search
None
See application file for complete search history.

(56) References Cited

U.S. PATENT DOCUMENTS

| | | |
|---|---|---|
| 2015/0285625 A1 | 10/2015 | Deane |
| 2016/0282468 A1 | 9/2016 | Gruver et al. |
| 2017/0003392 A1* | 1/2017 | Bartlett ............... G01S 17/42 |
| 2017/0115387 A1 | 4/2017 | Luders et al. |

(Continued)

FOREIGN PATENT DOCUMENTS

| | | |
|---|---|---|
| CN | 106564432 | 4/2017 |
| CN | 107430195 | 12/2017 |
| CN | 107957583 | 4/2018 |

(Continued)

OTHER PUBLICATIONS

International Search Report issued for corresponding International Patent Application No. PCT/EP2020/067233, mailed Oct. 6, 2020.

(Continued)

*Primary Examiner* — Hovhannes Baghdasaryan
(74) *Attorney, Agent, or Firm* — Kevin D. Wills

(57) ABSTRACT

A Lidar measuring system for detecting an object in an environment of a vehicle, with a first Lidar measuring device, which is configured to scan a first visual field with a first vertical resolution; and a second Lidar measuring device, which is configured to scan a second visual field with a second vertical resolution, wherein the second visual field lies in a vertical direction within the first visual field, and comprises an area of a roadway in front of the vehicle; and the second vertical resolution is higher than the first vertical resolution. Further, a vehicle with a Lidar measuring system and a method for detecting an object in an environment of a vehicle.

20 Claims, 3 Drawing Sheets

(56) References Cited

U.S. PATENT DOCUMENTS

2017/0179173 A1    6/2017   Mandai et al.
2017/0301716 A1    10/2017   Irish et al.

FOREIGN PATENT DOCUMENTS

| | | |
|---|---|---|
| CN | 108205325 | 6/2018 |
| CN | 108318895 | 7/2018 |
| CN | 102589843 | 7/2021 |
| DE | 19860986 | 7/2004 |
| DE | 102007001103 A1 | 7/2008 |
| KR | 10-2010-0112076 | 10/2010 |
| KR | 10-2017-0125107 | 11/2017 |
| KR | 10-1974472 | 5/2019 |
| WO | 2018118645 A1 | 6/2018 |
| WO | 2018127789 A1 | 7/2018 |

\* cited by examiner

LIDAR MEASURING SYSTEM WITH TWO LIDAR MEASURING DEVICES

CROSS-REFERENCE TO RELATED APPLICATIONS

This application is a continuation under 35 U.S.C. § 120 of International Application PCT/EP2020/067233, filed Jun. 19, 2020, which claims priority to German Patent Application DE 10 2019 211 739.2, filed Aug. 6, 2019, the contents of each of which are incorporated by reference herein.

FIELD OF THE INVENTION

The present invention relates to a Lidar measuring system for detecting an object in an environment of a vehicle. The present invention further relates to a vehicle with a Lidar measuring system, as well as to a method for detecting an object in an environment of a vehicle.

BACKGROUND

Modern vehicles (autos, transporters, trucks, motorcycles, etc.) have a plurality of sensors, which provide information to the driver and control individual functions of the vehicle in a partially or fully automated manner. The environment of the vehicle as well as other road users are acquired via sensors. Based upon the acquired data, a model of the vehicle environment can be generated, and changes in this vehicle environment can be reacted to.

Lidar (light detection and ranging) technology is here an important sensor principle for acquiring the environment. A Lidar sensor is based upon transmitting light signals and detecting the reflected light. A distance to the location of the reflection can be calculated by means of a runtime measurement. In addition, a relative velocity can be determined. Both unmodulated pulses as well as frequency-modulated signals (chirps) can here be used. A target can be detected by evaluating the received reflections. In terms of the technical realization of the Lidar sensor, a distinction is made between scanning and non-scanning systems. A scanning system is here most often based upon micromirrors and scanning the environment with a light spot, wherein reference is made to a coaxial system when the transmitted and received light pulses are deflected via the same micromirror. In non-scanning systems, several transmitting and receiving elements are statically arranged one next to the other (in particular so-called focal plane array arrangement).

In this conjunction, WO 2018/127789 A1 discloses Lidar systems and methods for detecting and classifying objects. In one implementation, the Lidar system can detect one or several surface angles of an object based upon one or several time distortions in reflected signals. In additional embodiments, the Lidar system can identify objects based upon reflection fingerprints, surface angle fingerprints or other measured properties. Other measured properties can here include the surface composition of an object, the ambient lighting, detection differences between several scanning times, and confidence values of several detection characteristics.

One challenge in the area of Lidar systems lies in the detection of smaller, darker and/or distant objects, wherein in particular objects lying on the roadway are relevant. For example, tires, dead animals, or lost cargo portions must preferably already be acquired at distances in excess of 100 m. A scanning Lidar sensor with a respective resolution or spot distance of 0.1° in a horizontal and vertical direction often already has difficulties in detecting a tire lying on the street at a distance of 50 m, even though the resolution would basically be sufficient. This stems from the fact that black objects have a very low reflectivity on the one hand, and that objects lying on the street most often only have a relatively slight expansion in the vertical direction on the other. If a tire falls into a gap in the detection grid, i.e., into a gap between two rows of light spots, a reliable detection cannot be guaranteed.

The approach of using a higher resolution places stringent requirements on the scanning system, and often results in an inadequate refresh rate, since the acquired data cannot be further processed at a high enough speed. Another approach involves the use of larger spots. However, the disadvantage to this is that the signal-to-noise ratio becomes low precisely in bright environments (sunlight, daylight), and makes a reliable object detection more difficult.

Proceeding from the above, the object of the present invention is to provide an approach toward an improved detection of obstacles. In particular, the goal is to be able to acquire objects lying on the street in the area in front of a vehicle with a higher reliability. Even distant, dark and/or flat objects are to be acquired as reliably as possible.

SUMMARY

In order to achieve this object, a first object of the invention relates to a Lidar measuring system for detecting an object in an environment of a vehicle, with:

A first Lidar measuring device, which is configured to scan a first visual field with a first vertical resolution; and
   a second Lidar measuring device, which is configured to scan a second visual field with a second vertical resolution, wherein
the second visual field lies in a vertical direction within the first visual field, and comprises an area of a roadway in front of the vehicle; and
the second vertical resolution is higher than the first vertical resolution.

In another aspect, the present invention relates to a vehicle with a Lidar measuring system as described before.

Additional aspects of the invention relate to a method configured according to the Lidar measuring system, as well as to a computer program product with program code for implementing the steps of the method while running the program code on a computer. In addition, an aspect of the invention relates to a storage medium on which a computer program is stored, which causes the method described herein to be implemented while running on a computer.

Preferred embodiments of the invention are described in the dependent claims. Let it be understood that the features mentioned above and yet to be explained below can be used not just in the respectively indicated combination, but rather also in other combinations or taken separately, without departing from the framework of the present invention. In particular, the vehicle, the method and the computer program product can be configured according to the embodiments described for the Lidar measuring system in the dependent claims.

Proposed according to the invention is a Lidar measuring system with two Lidar measuring devices. Both Lidar measuring devices each scan a visual field, wherein the second visual field lies at least in one vertical direction within the first visual field, and comprises an area of a roadway in front of the vehicle. The second Lidar measuring system offers a higher resolution in the vertical direction than the first Lidar measuring system. In this regard, it is proposed that a portion of the visual field be scanned in the vertical direction by means of two Lidar measuring devices. In particular the portion of the visual field or the portion of the environment of the vehicle that comprises the roadway in front of the vehicle is double scanned. The additional scanning by the second Lidar measuring device is here done at a higher resolution than the scanning by the first Lidar measuring device. The street in front of the vehicle is scanned at a higher resolution than the rest of the environment.

This makes it possible to detect flat objects lying on the street with a higher reliability. The range for detecting such objects can be increased, so that the safety of the vehicle while driving can be improved based upon an evaluation of the detected objects. Collisions with objects lying on the street can be prevented. The danger posed by objects lying on a street is diminished.

The first Lidar measuring device is here preferably configured as a scanning Lidar measuring device with a 2D scanner unit. In particular, a micromirror operated by means of a corresponding microelectromechanical system (MEMS) or by means of a galvanometer can be used for the 2D scanner unit. A micromirror scans the visual field row-by-row. A high resolution can hereby be realized at high refresh rates. A reliable object detection of objects in the environment of the vehicle is achieved.

The second Lidar measuring device preferably comprises a receiving unit in a focal plane array arrangement. Use is made of a sensor, in which reception functions via several receiving elements arranged in a grid. In particular a receiving unit that can be activated row-by-row or read out row-by-row can here be used. Such a focal plane array arrangement permits a realization of high refresh rates and high resolutions. A reliable detection of objects lying on the street can be achieved.

In a preferred embodiment, the Lidar measuring system comprises an input interface for receiving an input signal with information about a position of the roadway in relation to the Lidar measuring system. The second Lidar measuring device is configured to adjust the second visual field based upon the input signal. In other words, the visual field of the second Lidar measuring device is adjusted based upon a progression of the roadway in front of the vehicle. An adjustment is here understood in particular as an adjustment of the size and alignment of the visual field in the vertical direction. For example, an uneven street may require an enlarged visual field in the vertical direction, or a slope or gradient of the street along with an excess vehicle cargo may necessitate an adjusted alignment. In particular, the adjustment can here take place dynamically or continuously. In this regard, the use of an input signal allows for an optimization of the second visual field. The required processor power is minimized, and the reliability can be improved.

In a preferred embodiment, the second Lidar measuring device is configured to select active cells [sic] of the receiving unit based upon the input signal. In particular, it is possible to adjust a receiving unit in a focal plane array arrangement to current requirements by selecting active rows. Depending on which portion of the visual field is relevant, the corresponding rows of the receiving unit are activated. Only data corresponding to a relevant area are evaluated. As a result, the refresh frequency can be increased, and objects on the roadway can be reliably detected.

In a preferred embodiment, the input interface is configured to receive an environment sensor signal of an environment sensor as the input signal. Additionally or alternatively, the input interface is configured to receive a position sensor signal of a position sensor as the input signal. Additionally or alternatively, the input interface is configured to receive map data of a map database as the input signal. Further additionally or alternatively, the input interface is configured to receive an output signal of the first Lidar measuring device as the input signal. Varying parameters that allow an assertion as to the progression of the roadway in relation to the Lidar measuring system can be used as the input signal. Let it be understood that several different input signals can also be used to adjust the second visual field. Depending on the current situation, a second visual field adjusted or optimized for this situation is used. A reliable detection of objects lying on the street is realized.

In a preferred embodiment, the second Lidar measuring unit is configured to adjust a vertical expansion of the second vertical visual field based upon the input signal. In particular, it can be advantageous to change or adjust a vertical expansion proceeding from the input signal. For example, an uneven street may require a larger vertical visual field. An optimization is achieved with regard to the data to be evaluated or the current situation.

In a preferred embodiment, the Lidar measuring device is configured to determine a horizontal line based upon the input signal, and to adjust the second visual field based upon the horizontal line. It is possible to detect a horizontal line, for example based upon a signal of a camera, and to align the second visual field proceeding from this horizontal line in such a way as to image an area below the horizontal line in which the roadway runs. Let it be understood that the horizontal line can be determined using the first or second Lidar measuring unit.

In a preferred embodiment, the first visual field comprises a vertical angle of between 20° and 30°, preferably 25°. The first vertical resolution measures between 0.2° and 0.8°, preferably at most 0.4°. Additionally or alternatively, the second visual field comprises a vertical angle of between 1° and 15°, preferably 5° to 8°. The second vertical resolution lies between 0.05° and 0.15°, preferably at 0.1°. In this regard, the first visual field comprises a vertical angle that corresponds to a multiple of the vertical angle of the second visual field. This large of an angle is necessary to ensure a reliable detection of possibly relevant objects in the environment of the vehicle. The second visual field comprises a significantly smaller vertical angle, which is sufficient for observing the roadway surface. However, a higher resolution can be used within this significantly smaller vertical angle. Proposed in this regard is the use of an adjusted resolution in different areas in front of the vehicle.

In a preferred embodiment, a first scanning rate of the first Lidar measuring device is smaller than a second scanning rate of the second Lidar measuring device. The first scanning rate here lies between 10 Hz and 15 Hz, preferably at 12.5 Hz. The second scanning rate lies between 20 Hz and 70 Hz, preferably between 25 Hz and 50 Hz. In particular, the second Lidar measuring device can also use a higher scanning rate in addition to the higher resolution. This makes it possible to ensure a better tracking of objects lying on the street. Reliability during object detection is improved, and the safety of a vehicle operating autonomously or partially autonomously based upon the Lidar measuring system is increased.

In a preferred embodiment, the second visual field comprises at least between 20 and 100 rows, in particular 50 to 80 rows. In particular, a row-by-row operating system is used. If at least 40 to 50 rows are provided, a sufficient reliability can be achieved during the detection of objects lying on the street.

In particular, an environment of a vehicle comprises an area in the environment of the vehicle that is visible from the vehicle. An object can be a static object, such as house, a tree, or a traffic sign. An object can likewise be a dynamic object, for example another vehicle or a pedestrian. A visual area or a visual field of a Lidar measuring device corresponds to an area viewable by the Lidar measuring device. In particular, a visual field is established by indicating an angle in the vertical direction and an angle in the horizontal direction. A vertical visual field or a vertical visual area can be established by indicating an angle in the vertical direction in relation to the vehicle or to the Lidar measuring device. A resolution of a Lidar measuring device corresponds to an indication of dots or rows and columns per angle range. Each dot is read out once per scanning process. An area of a roadway corresponds in particular to the portion of a visual field in which the roadway runs, in particular to the portion of the visual field in which the roadway runs in an area between 50 and 150 m in front of the vehicle. The position of a roadway is understood in particular as an indication of an alignment of the roadway in a vehicle fixed coordinate system. For example, an angle of a roadway plane relative to a horizontal plane of the vehicle can correspond to a position of the roadway. Let it be understood that more comprehensive indications can also describe a position of the roadway.

BRIEF DESCRIPTION OF THE DRAWINGS

The invention will be described and explained in greater detail below based upon several selected exemplary embodiments in conjunction with the attached drawings.

DETAILED DESCRIPTION OF THE PREFERRED EMBODIMENTS

Figure 1:
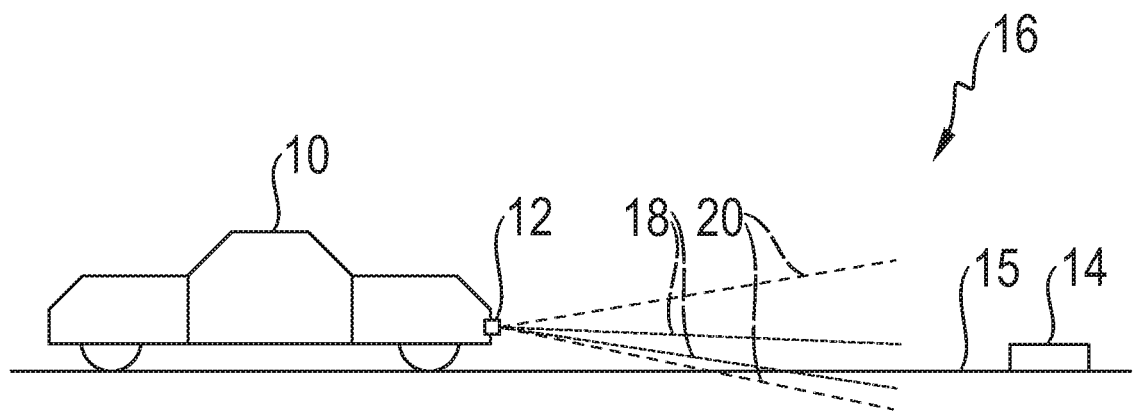
FIG. 1 is a schematic view of a vehicle according to the invention with a Lidar measuring system.

FIG. 1 schematically shows a vehicle 10 according to the invention with a Lidar measuring system 12 for detecting an object 14 in an environment 16 of the vehicle 10. The illustration corresponds to a side sectional view. In the depicted exemplary embodiment, the Lidar measuring system 12 is integrated into the vehicle 10. For example, the Lidar measuring system 12 can be mounted in the area of a bumper of the vehicle 10, and configured to detect objects in front of the vehicle 10 within a visual field. In the illustration, the expansion of the visual field in a vertical direction is denoted by dashed lines. For example, the object 14 in the environment 16 of the vehicle 10 can be a car tire lying on the roadway 15 or some other obstacle.

The invention provides that the Lidar measuring system 12 comprise two Lidar measuring devices that scan the visual field. A first visual field 18 is here scanned by the first Lidar measuring device, and a second visual field 20 is scanned by the second Lidar measuring device. The second visual field 20 lies in a vertical direction within the first visual field 18. The second visual field 20 comprises the area of the roadway 15 in front of the vehicle 10. In this regard, the second Lidar measuring device enables a detection of objects 14 lying on the roadway 15. The resolution of the second Lidar measuring device within the second visual field is higher than the resolution of the first Lidar measuring device within the (larger) first visual field. Relevant here in particular is a vertical resolution, i.e., a resolution in the vertical direction. In particular, a resolution in the vertical direction is understood as a number of rows per angle.

Figure 2:
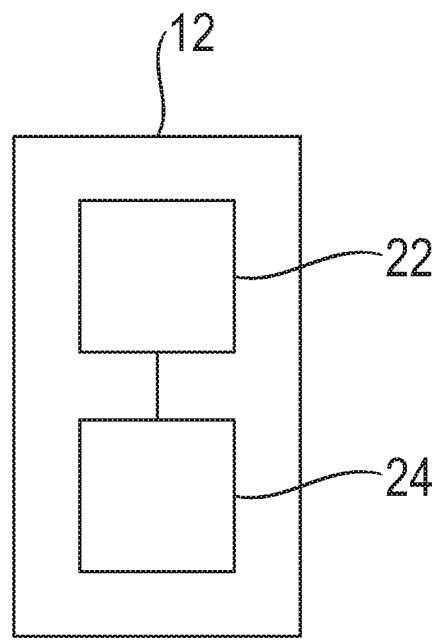
FIG. 2 is a schematic view of a Lidar measuring system according to the invention.

FIG. 2 schematically shows a Lidar measuring system 12 according to the invention. The Lidar measuring system 12 comprises a first Lidar measuring device 22 as well as a second Lidar measuring device 24.

In particular, the first Lidar measuring device 22 can be configured as a scanning Lidar measuring device with a 2D scanner unit. This type of Lidar measuring device makes it possible to image a comparatively large area in a high resolution. However, the transmitted light signal or laser signal might miss flat objects if the position of the object changes between two scanning times. The object can thus systematically fall into gaps between individual rows. Apart from that, the time factor might likewise cause smaller objects to be missed while sequentially scanning several rows and columns. For example, the corresponding area of the visual field can only be hit every 5 to 10 ms in a 40 ms scan frame for a small object, such as a tire. There is a comparatively high probability that the light signal will not be aimed at the object at the right time.

The second Lidar measuring device 24 is used to scan the area of the visual field comprising the roadway with a higher resolution, and thereby improve an object acquisition of objects located therein. To this end, the second Lidar measuring device has a smaller second vertical visual field, but one in which a higher resolution is realized. The second Lidar measuring device can here advantageously comprise a receiving unit in a focal plane array arrangement. It is here possible for a row-by-row readout to take place, wherein a respective complete row is acquired at one point in time. As a result, a higher scanning frequency can be realized.

For example, one possible opening angle of the second visual field in the vertical direction can take place based upon a geometric examination of an installation height of the Lidar measuring system 12 over the roadway 15 (e.g., 0.5 m) as well as an examination of the distance to be covered (e.g., 10 m). Proceeding from these values, for example, an angle in the vertical direction of the second visual field of 2.8° arises. A required angular resolution for the second Lidar measuring device can be determined proceeding from a height of the object in a vertical direction and a distance of the object. For example, a required angular resolution of 0.11° arises for an object height of 20 cm and a distance of 100 m. A corresponding resolution can be determined proceeding from such an examination and comparable calculations.

Figure 3:
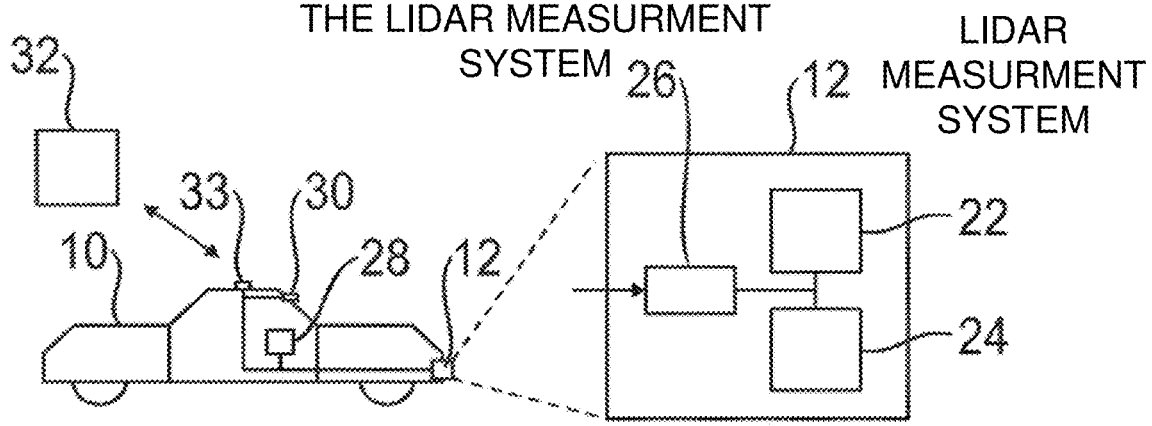
FIG. 3 is a schematic view of a vehicle with a further embodiment of a Lidar measuring system.

FIG. 3 schematically shows an embodiment of the vehicle 10 according to the invention. The Lidar measuring system 12 of the vehicle 10 is here depicted in a magnified view on the right side for better clarity. Apart from the first Lidar measuring device 22 and the second Lidar measuring device 24, the Lidar measuring system 12 in the exemplary embodiment shown has an input interface 26 that is configured to receive an input signal with information about a progression or a position of the roadway in relation to the Lidar measuring system 12. Proceeding from this input signal, the second visual field can be adjusted. In particular, it is possible to adjust the alignment of the second visual field in comparison to the first visual field, as well as a size of the second visual field in the vertical direction.

For example, a sensor signal of a position sensor 28 within the vehicle 10 can be used as the input signal for adjustment. In addition, it is possible to use an environment sensor signal of an environment sensor 30 of the vehicle. For example, a signal of a radar, Lidar, ultrasound, or camera sensor on the vehicle 10 can be used.

It is likewise possible and advantageous that a signal of the Lidar measuring system or the first or second Lidar measuring device itself be used as the input signal. A progression or a position of the roadway can be detected based upon such a signal of an environment sensor. In particular, a position of a horizontal line can be determined via algorithms of the image evaluation. Based thereupon, it is then possible to adjust the second visual field accordingly. It is further possible to use map data of a map database 32 as the input signal. In the exemplary embodiment shown, the map database 32 is here a remote database, for example which can be configured as an internet database of a corresponding service provider. In order to communicate with this map database 32, the vehicle 10 has a mobile communication unit 33 in the depicted exemplary embodiment. Let it be understood, however, that the map database can also be arranged inside of the vehicle, for example in a vehicle navigation system. In order to communicate with the various units, the Lidar measuring system can be hooked up to a bus system of the vehicle 10, for example.

Figure 4:
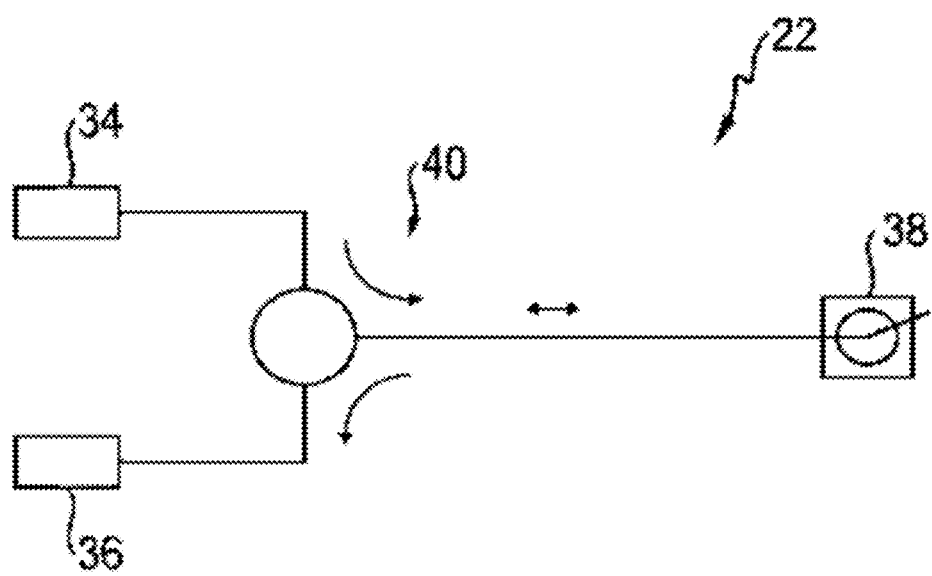
FIG. 4 is a schematic view of a scanning Lidar measuring device with a 2D scanner unit.

FIG. 4 schematically shows an example for a first Lidar measuring device 22. The first Lidar measuring device 22 comprises a transmitter 34 for transmitting a light signal and a receiver 36 for receiving the light signal after reflected on the object. In particular, the transmitter 34 is configured as a laser source. On the one hand, it is possible to use a pulsed signal. On the other hand, a frequency-modulated signal (chirp signal) can also be used. In particular, the receiver 36 corresponds to a photodetector, which is configured to receive the light signal after reflected on an object, and thereby enable a detection of the object.

The first Lidar measuring device 22 further comprises a 2D scanner unit 38, so as to scan the visual field of the first Lidar measuring device 22. In particular, the 2D scanner unit 38 can be configured as a microelectromechanical system (MEMS). It is likewise possible to use a galvanometer. A micromirror is actuated to transmit the light signal to different positions, and correspondingly receive detections of the different positions. In particular, a first visual field of the first Lidar measuring device 22 is here scanned row-by-row. In this regard, there is a fast horizontal axis and a slower vertical axis, which each can be actuated by accompanying actuators. In particular, the 2D scanner unit 38 offers a corresponding control interface, so that the vertical and horizontal movement of the mirror can be actuated. In particular, which angle between two rows or columns is to be used can be determined for the axes. For example, a first resolution can measure 0.1°×0.1° in the horizontal and vertical direction. In this regard, the row distance corresponds to an angle indication.

The first Lidar measuring device 22 further comprises a combination unit 40. In the exemplary embodiment shown, the combination unit 40 is configured as a circulator. It is likewise possible that the combination unit 40 correspond to a beam splitter. The disadvantage to using a beam splitter is that a portion of the signal is lost. However, advantages do arise with respect to the reaction rate and with regard to the production costs.

Because the same path is used for the transmitted light signal and for the received light signal between the 2D scanner unit 38 and combination unit 40, the depicted first Lidar measuring device 22 is also referred to as a coaxial Lidar measuring device or as a Lidar measuring device with a coaxial design.

Figure 5:
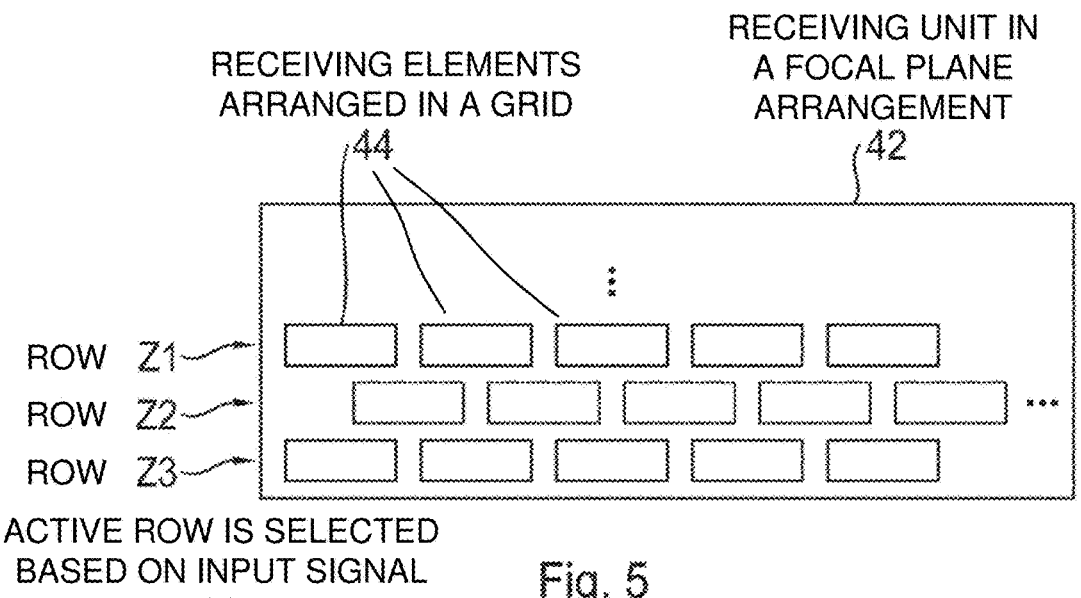
FIG. 5 is a schematic view of a receiving unit of a Lidar measuring device in a focal plane array arrangement.

Schematically illustrated on FIG. 5 is a receiving unit 42 of a second Lidar measuring device. The receiving unit 2 is configured in a focal plane array configuration, and comprises several individual receiving elements 44, which are essentially arranged in one plane on a corresponding chip in several rows Z1, Z2, Z3. Let it be understood that the first Lidar measuring device 22 comprises a correspondingly configured transmitting unit, which likewise can be configured in a focal plane array configuration. A row-by-row readout is possible. In addition, it is possible to adjust the second visual field by only partially activating or reading out the rows.

Figure 6:
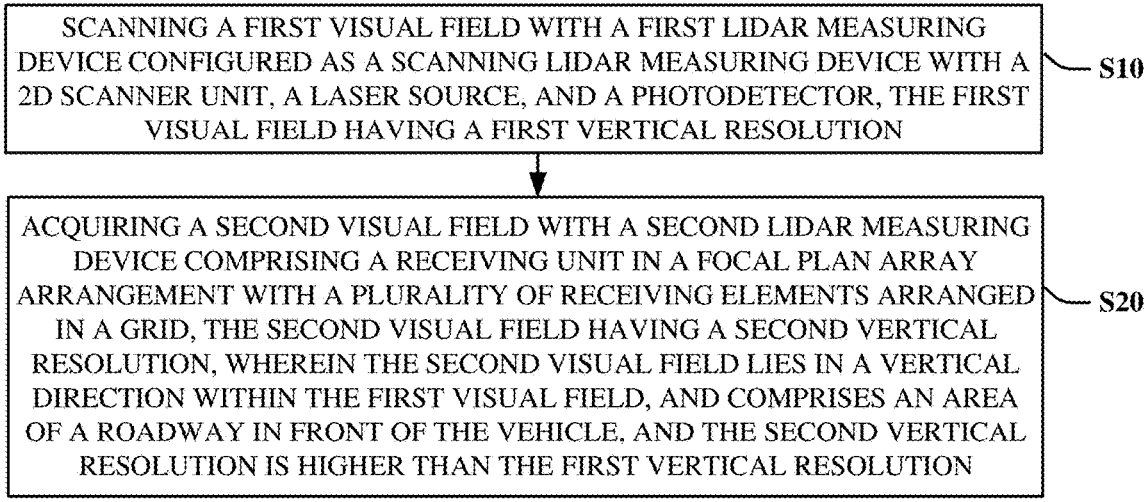
FIG. 6 is a schematic view of a method according to the invention.

Schematically depicted on FIG. 6 is a method according to the invention for detecting an object in an environment of the vehicle. The method comprises steps of scanning S10 a first visual field and scanning S12 a second visual field 32. For example, the method can be implemented in software that runs on a microprocessor of a vehicle control device or a Lidar measuring system. In particular, the method can be used as a control software of a Lidar measuring system.

The invention was comprehensively described and explained based upon the drawings and the specification. The specification and explanation are to be construed as an example, and not as limiting. The invention is not limited to the disclosed embodiments. Other embodiments or variations arise for the expert during the use of the present invention as well as during a precise analysis of the drawings, the disclosure, and the following claims.

In the claims, the words "comprise" and "with" do not rule out the presence of additional elements or steps. The undefined article "a" or "an" does not preclude the presence of a plurality. A single element or a single unit can perform the functions of several units mentioned in the claims. An element, a unit, an interface, a device, and a system can be partially or completely converted into hardware and/or software. The mere mention of several measures in several different dependent claims must not be taken to mean that advantageous use could likewise not be made of a combination of these measures. Reference numbers in the claims, if any, are not to be understood as limiting.

The invention claimed is:

1. A Lidar measuring system for detecting an object in an environment of a vehicle comprising:
    a first Lidar measuring device, configured as a scanning Lidar measuring device with a two dimensional (2D) scanner unit, the first Lidar measuring device being configured to scan a first visual field with a first vertical resolution, the first Lidar measurement device including a first laser source and a first photodetector;
    a second Lidar measuring device, comprising a receiving unit in a focal plane array arrangement with a plurality of receiving elements arranged in a grid, the second Lidar measuring device being configured to acquire a second visual field with a second vertical resolution, wherein the second visual field lies in a vertical direction within the first visual field, and comprises an area of a roadway in front of the vehicle, and wherein the second vertical resolution is higher than the first vertical resolution; and
    an input interface configured to receive an input signal with information about a position of the roadway in relation to the Lidar measuring system, wherein the second Lidar measuring device is configured to select active rows of the receiving unit based upon the input signal, such that only data corresponding to a relevant area of the second visual field are evaluated.

2. The Lidar measuring system according to claim 1, wherein the first Lidar measuring device comprises a micromirror operated by a microelectromechanical system (MEMS) for scanning the first visual field row-by-row.

3. The Lidar measuring system according to claim 1, wherein the second Lidar measuring device is further configured to select more active rows of the receiving unit when the input signal indicates an uneven roadway.

4. The Lidar measuring system according to claim 1, wherein the input interface is configured to receive a position sensor signal of a position sensor as the input signal.

5. The Lidar measuring system according to claim 1, wherein the second Lidar measuring device is configured to select active rows (Z1, Z2, Z3) of the receiving unit based upon the input signal indicating a slope in the roadway in front of the vehicle.

6. The Lidar measuring system according to claim 1, wherein the input interface is configured to receive an environment sensor signal of an environment sensor as the input signal.

7. The Lidar measuring system according to claim 1, wherein the second Lidar measuring device is configured to adjust a vertical expansion of the second visual field based upon the input signal.

8. The Lidar measuring system according to claim 1, wherein the second Lidar measuring device is configured to determine a horizontal line based upon the input signal, and to adjust the second visual field based upon the horizontal line.

9. The Lidar measuring system according to claim 1, wherein the first visual field comprises a vertical angle of between 20° and 30°, preferably 25°, and a first vertical resolution measures between 0.2° and 0.8°, preferably at most 0.4°; and/or the second visual field comprises a vertical angle of between 1° and 15°, preferably 5° to 8°, and a second vertical resolution lies between 0.05° and 0.15°, preferably at 0.1°.

10. The Lidar measuring system according to claim 1, wherein the input interface is configured to receive an output signal of the first Lidar measuring device as the input signal.

11. The Lidar measuring system according to claim 10, wherein the input interface is configured to receive the output signal of the first Lidar measuring device indicating a presence of an object in an area of the roadway, and the second Lidar measuring device is configured to activate additional rows of the receiving unit in response to the presence of the object.

12. A vehicle including a Lidar measuring system, the Lidar measuring system comprising:
a first Lidar measuring device configured to scan a first visual field with a first vertical resolution, the first Lidar measuring device comprising a laser source, a 2D scanner unit, and a photodetector, and being configured to generate an output signal representing detected objects in the first visual field;
a second Lidar measuring device comprising a receiving unit in a focal plane array arrangement with a plurality of receiving elements arranged in a grid, the second Lidar measuring device being configured to acquire a second visual field with a second vertical resolution, wherein the second visual field is vertically aligned within a portion of the first visual field and comprises at least a portion of a roadway in front of the vehicle, and the second vertical resolution is higher than the first vertical resolution;
an input interface configured to receive at least one input signal selected from the group consisting of an environment sensor signal, a position sensor signal, map data, and the output signal of the first Lidar measuring device, the input signal comprising information about a position or progression of the roadway in relation to the Lidar measuring system;
wherein the second Lidar measuring device is configured to dynamically adjust a size and alignment of the second visual field in a vertical direction based on the input signal, and to selectively activate or read out only those rows of the receiving unit corresponding to a relevant area of the second visual field.

13. A method for detecting an object in an environment of a vehicle, comprising following steps:
scanning a first visual field with a first Lidar measuring device configured as a scanning Lidar measuring device with a 2D scanner unit, a laser source, and a photodetector, the first visual field having a first vertical resolution;
acquiring a second visual field with a second Lidar measuring device comprising a receiving unit in a focal plane array arrangement with a plurality of receiving elements arranged in a grid, the second visual field having a second vertical resolution, wherein the second visual field lies in a vertical direction within the first visual field, and comprises an area of a roadway in front of the vehicle, and the second vertical resolution is higher than the first vertical resolution;
receiving, at an input interface, an input signal with information about a position of the roadway in relation to the vehicle; and
selecting active rows of the receiving unit of the second Lidar measuring device based upon the input signal, such that only data corresponding to a relevant area of the second visual field are evaluated.

14. A non-transitory machine-readable medium, comprising executable instructions that, when executed by a processing system including a processor, facilitate performance of operations, the operations comprising:
scanning a first visual field with a first Lidar measuring device with configured as a scanning Lidar measuring device with a 2D scanner unit, the first visual field having a first vertical resolution;
acquiring a second visual field with a second Lidar measuring device comprising a receiving unit in a focal plane array arrangement with a plurality of receiving elements arranged in a grid, the second visual field having a second vertical resolution, wherein the second visual field lies in a vertical direction within the first visual field, and comprises an area of a roadway in front of a vehicle, and the second vertical resolution is higher than the first vertical resolution;
receiving, at an input interface, an input signal with information about a position of the roadway in relation to vehicle; and
selecting active rows of the receiving unit of the second Lidar measuring device based upon the input signal, such that only data corresponding to a relevant area of the second visual field are evaluated.

15. The vehicle of claim 12, wherein the second Lidar measuring device is configured to increase a vertical expansion of the second visual field in response to the input signal indicating an uneven roadway or a slope in the roadway in front of the vehicle.

16. The vehicle of claim 12, wherein the input interface is configured to receive map data from a remote map database or a vehicle navigation system as the input signal.

17. The vehicle of claim 12, wherein the input interface is configured to receive an output signal from the first Lidar measuring device as the input signal.

18. The non-transitory machine-readable medium of claim 14, wherein the second Lidar measuring device is configured to increase a vertical expansion of the second visual field in response to the input signal indicating an uneven roadway or a slope in the roadway in front of the vehicle.

19. The non-transitory machine-readable medium of claim 14, wherein the input interface is configured to receive map data from a remote map database or a vehicle navigation system as the input signal.

20. The non-transitory machine-readable medium of claim 14, wherein the input interface is configured to receive an output signal from the first Lidar measuring device as the input signal.

* * * * *